J. D. PRYOR.
CHEWING GUM.
APPLICATION FILED APR. 14, 1916.
1,193,423.
Patented Aug. 1, 1916.
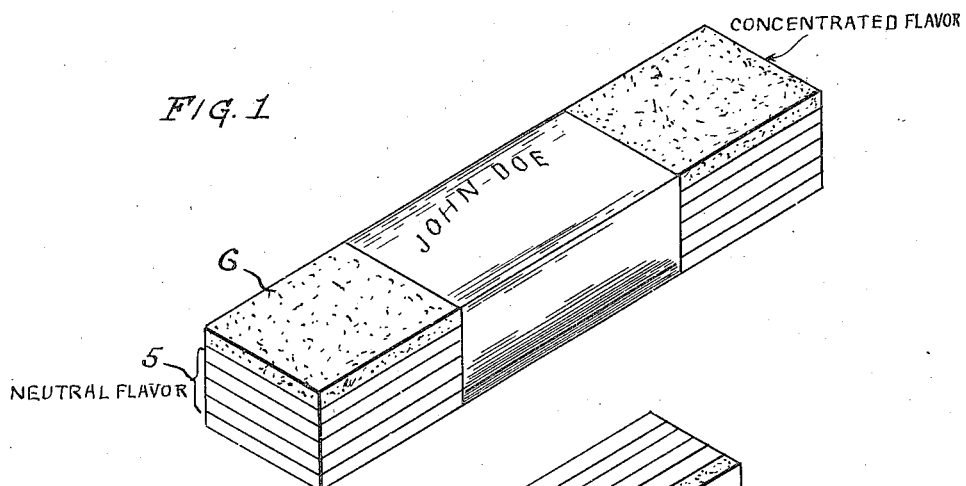
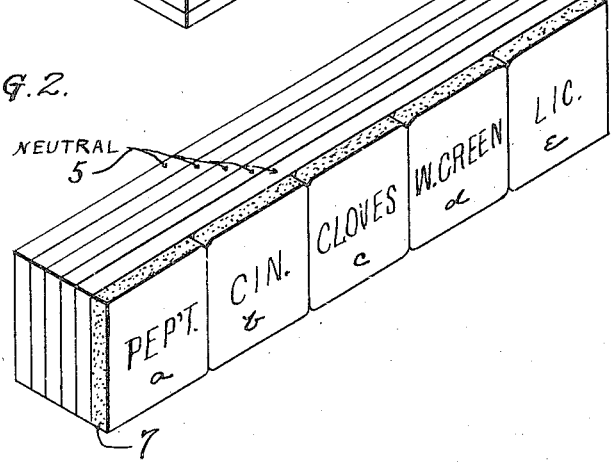
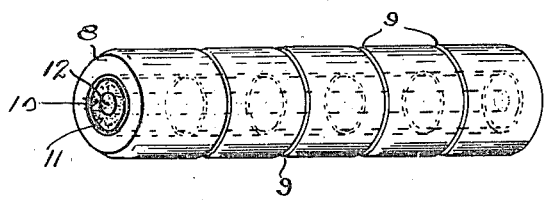
Inventor
JOHN DONALD PRYOR
By his Attorneys
Howson and Howson

UNITED STATES PATENT OFFICE.

JOHN DONALD PRYOR, OF PROVIDENCE, RHODE ISLAND.

CHEWING-GUM.

1,193,423.  Specification of Letters Patent.  Patented Aug. 1, 1916.

Application filed April 14, 1916. Serial No. 91,087.

*To all whom it may concern:*

Be it known that I, JOHN DONALD PRYOR, a citizen of the United States of America, and residing in the city and county of Providence and State of Rhode Island, have invented a certain new and useful Improvement in Chewing-Gum, of which the following is a specification.

My invention relates to chewing gum and particularly to means for flavoring the same, and the particular object of my invention is to provide means whereby a purchaser may flavor the gum to suit individual taste or reflavor gum from which the flavor has been exhausted or combine flavors or otherwise adapt the flavor of a piece of gum in various ways to meet a temporary whim or an established preferred taste.

In the accompanying drawing, Figure 1 is a perspective of a package of chewing gum in which my invention is embodied; Fig. 2 is a similar view of a modified embodiment of the invention; and Fig. 3 is a perspective of a further modification.

It is a well known fact that chewing gums produced by different manufacturers vary in taste even when bearing the same flavor, some being more highly flavored than others. Some purchasers prefer the highly flavored gums, while others prefer the mild flavored gums. But the same person who prefers a highly flavored gum of one flavor, may prefer a mildly flavored gum of another flavor. This puts upon the purchaser the necessity of experimenting with gums of various makes in order to find that particular make which suits her or his taste for each flavor. In any case, as gum is now packaged, each stick or piece of gum in the package carries the same flavor and the amount of flavor which it carries is only what its manufacturer regards as sufficient to impart thereto a pleasing taste. No means are afforded for reflavoring this gum after its original flavor has been chewed out, save by adding a portion of a fresh stick. But inasmuch as the latter carries only enough flavor for itself, the flavor which it imparts to the flat, chewed-out gum, is weak and the result of the attempt to reflavor is so unsatisfactory that the usual custom is to discard the old gum entirely.

The present invention consists in providing a stick of highly concentrated flavor, which may be sold either by itself or associated with a supply of neutral gum, viz. unflavored or mildly flavored gum,—and by means of which the flavor of the neutral gum may be highly flavored, if desired, or reflavored after its original flavor has been exhausted. This flavor stick may carry a plurality of flavors at different points, and may be used to vary the flavor of the neutral gum by combining one flavor with another and at various intensities of flavor.

In the embodiment of my invention illustrated in Fig. 1, the gum package comprises several sticks 5 of neutral gum and an additional stick 6 of concentrated flavor. This flavor stick may be made of gum but it need not be so. It may be made of any suitable substance which will yield its flavor to the neutral gum by "chewing in," without the likelihood that a large proportion of the flavor will be first lost by dissolving in the saliva before it has entered the gum.

In use, a stick of neutral gum may be combined, when first chewed, with a portion of the flavor stick in order to secure a high flavor, if that is desired. When this, or the milder flavor of the normal neutral gum is exhausted, the desired flavor may be completely restored by merely adding another portion of the highly flavored stick 6, the amount used being proportioned to the intensity of the flavor desired.

In the second embodiment of my invention, (Fig. 2) the flavor stick 7 comprises a plurality of sections *a*, *b*, *c*, *d*, *e*, each of concentrated but different flavor. Thus the five sections may, as shown, carry the following flavors, viz., peppermint, wintergreen, cinnamon, cloves and licorice. Each of these sections is sufficiently highly flavored to impart to a full stick 5 of neutral gum a high flavor, or to restore to it, its normal mild flavor. If the purchaser wishes to experiment, and nothing is more entertaining than experimenting with flavors, it is possible to secure many modifications of taste by variously combining the differently flavored sections of the stick 7 with the neutral gum.

In the third embodiment of my invention (Fig. 3) the package comprises a tube 8 of neutral gum, preferably with annular grooves 9 to facilitate the partition of the tube. Within the central bore of the tube, I arrange a flavor stick core 10. This core may be merely a gum of concentrated flavor like the flavor sticks of Figs. 1 and 2. As illustrated, however, it comprises a casing 11 of gum (which may be flavored) and a central flavor vehicle 12. The latter may be of a type e. g. a sugar preparation, which will carry a more concentrated flavor than can be imparted to a gum. If desired, this flavor core may be formed in sections after the fashion of the flavor stick of Fig. 2, and each section carry a different flavor, or the core can be of a single flavor. In any event, however, it is separated from the neutral gum by suitably dusting the adjacent surfaces to prevent sticking. The neutral tube sections are thus capable of being broken apart and used while the flavor stick core remains intact, or is used only to accentuate the flavor of the neutral gum, or to restore its flavor or to modify the flavor by combining different flavors.

While I have shown in each case a flavor stick associated with neutral gum sticks to form a combination package, it is to be understood that the flavor sticks may be separately packaged or sold by themselves, and in the subjoined claims, I employ the word package in a sense broad enough to cover both embodiments of my invention.

It should be added that the flavor sticks are so highly flavored that they would not be pleasing to the taste of the majority of users, unless combined with a portion of neutral gum, or their concentrated flavor otherwise diluted.

While I have illustrated three embodiments of my invention, it should be clearly understood that I do not limit my invention to the details here shown. Various modifications of form, arrangement and combination will readily occur to those skilled in the art without departing from what I claim as my invention.

I claim as my invention:—

1. A package of chewing gum comprising a supply of neutral gum and an accompanying concentrated flavor stick.

2. A package of chewing gum comprising as an element thereof a highly-concentrated-flavor stick.

3. A package of gum comprising a supply of neutral gum and an accompanying stick of gum having a highly-concentrated flavor.

4. A package of gum comprising as an element thereof a stick of gum having a highly-concentrated flavor.

5. A package of gum comprising as an element thereof a stick of gum having a plurality of sections each possessing a different flavor.

6. A package of gum comprising as an element thereof a stick of gum having a plurality of sections each possessing a different highly-concentrated flavor.

7. As a new article of manufacture, a flavoring means for chewing gum comprising a solidified vehicle flavored more highly than is pleasing to the average taste, and adapted to yield its flavor to a "flat" gum by chewing said gum and vehicle together.

8. As a new article of manufacture, a flavoring means for chewing gum comprising a vehicle flavored more highly than is pleasing to the average taste, and adapted to yield its flavor to a "flat" gum by chewing said gum and vehicle together, said vehicle having a casing of gum surrounding the same.

9. A package of chewing gum comprising a tubular body of neutral gum and an independent confection stick forming a core therefor.

10. A package of chewing gum comprising a tubular body of neutral gum and an independent flavor stick forming a core therefor.

In testimony whereof I have signed my name to this specification, in the presence of two subscribing witnesses.

JOHN DONALD PRYOR.

Witnesses:
GEORGE T. MARSH,
EUNICE G. MANCHESTER.